(12) United States Patent
Baker et al.

(10) Patent No.: US 12,734,846 B2
(45) Date of Patent: Sep. 15, 2026

(54) NON-PNEUMATIC TIRE

(71) Applicant: Triangle Tyre Co. Ltd., Weihai (CN)

(72) Inventors: Christopher Timothy Baker, Peninsula, OH (US); Brad Wurst, Wadsworth, OH (US)

(73) Assignee: Triangle Tyre Co. Ltd., Weihai (CN)

( * ) Notice: Subject to any disclaimer, the term of this patent is extended or adjusted under 35 U.S.C. 154(b) by 224 days.

(21) Appl. No.: 18/764,663

(22) Filed: Jul. 5, 2024

(65) Prior Publication Data

US 2025/0319723 A1 Oct. 16, 2025

Related U.S. Application Data

(60) Provisional application No. 63/633,956, filed on Apr. 15, 2024.

(51) Int. Cl.
*B60C 7/10* (2006.01)

(52) U.S. Cl.
CPC .............. *B60C 7/101* (2021.08); *B60C 7/102* (2013.01)

(58) Field of Classification Search
CPC .. B60C 7/00; B60C 7/08; B60C 7/101; B60C 7/102; B60C 7/14; B60C 7/143; B60C 7/146; B60C 7/18; B60C 15/0206; B60C 15/04; B60C 15/022; B60B 9/00; B60B 9/04; B60B 9/10; B60B 9/12; B60B 7/063; Y02T 10/86
See application file for complete search history.

(56) References Cited

U.S. PATENT DOCUMENTS

| | | | | |
|---|---|---|---|---|
| 3,018,809 A * | 1/1962 | Bernard | .................... | B60C 7/24 152/301 |
| 8,714,217 B2 * | 5/2014 | Chon | ........................ | B60C 7/14 152/17 |

(Continued)

FOREIGN PATENT DOCUMENTS

| | | |
|---|---|---|
| CA | 2865520 C | 9/2013 |
| CN | 106379113 A | 2/2017 |

OTHER PUBLICATIONS

"Turf Tech Tire", webpage, <https://www.turftechtire.com/>, 7 pages, retrieved on Feb. 11, 2026.

(Continued)

*Primary Examiner* — Jason R Bellinger
*Assistant Examiner* — Taekwon Choi
(74) *Attorney, Agent, or Firm* — Renner, Otto, Boisselle & Sklar, LLP

(57) ABSTRACT

A non-pneumatic tire comprising a pair of annular inner rim beads disposed parallel to each other and defining a cylinder, wherein the rim beads define the opposing ends of the cylinder, wherein the cylinder has an axis of rotation coincident with an axis of rotation of the tire wherein outer and inner are relative to the axis of rotation of the tire, where inner is closer to the axis of rotation and outer is further away from the axis of rotation; an annular outer layer oriented concentric with the circumference of the cylinder and comprising an outermost tread surface, the tread surface comprising tread rubber and tire carcass; a plurality of spaced apart support units, each support unit including: top and bottom members; a plurality of flexible curved support members extending between the top member and bottom member.

11 Claims, 14 Drawing Sheets

(56) References Cited

U.S. PATENT DOCUMENTS 8,757,228 B2 * 6/2014 Dutton ...................... B60B 9/26
152/10
D711,815 S 8/2014 Abe
8,944,125 B2 2/2015 Manesh
9,272,576 B2 3/2016 Dotson
9,290,053 B2 3/2016 Choi
9,333,799 B2 5/2016 Choi
9,475,244 B2 10/2016 Williams
10,040,314 B2 * 8/2018 Siegel ...................... B60B 9/12
10,052,919 B2 8/2018 Asper
10,682,886 B2 6/2020 Talbot
10,953,696 B2 3/2021 Thompson
11,117,422 B2 * 9/2021 Tsuji ...................... B60C 7/14
11,235,619 B2 * 2/2022 Tsuji ...................... B60C 7/10
11,298,979 B2 4/2022 Youn
11,331,950 B2 5/2022 Hwang
11,654,718 B2 5/2023 Tsuji
11,679,627 B2 6/2023 Heo
11,731,459 B2 8/2023 Hosomi
11,745,542 B2 9/2023 Cron
11,745,543 B2 9/2023 Liu
2011/0272254 A1 * 11/2011 Anderfaas ................ B60B 9/26
492/15
2017/0087931 A1 3/2017 Gaylo
2017/0174002 A1 * 6/2017 Downing .................. B60C 7/24
2018/0326796 A1 11/2018 Asper
2020/0398614 A1 12/2020 Geng
2021/0061011 A1 3/2021 Kajiwara
2021/0114312 A1 4/2021 Wilson
2021/0268837 A1 9/2021 Fontaine
2021/0268838 A1 9/2021 Fontaine
2022/0016857 A1 1/2022 Haidet
2022/0048325 A1 2/2022 Rimai
2022/0185016 A1 6/2022 Downing
2022/0194036 A1 6/2022 Sportelli
2022/0203766 A1 * 6/2022 Tahara .................... B60C 7/146
2022/0203770 A1 6/2022 Tahara
2022/0363024 A1 11/2022 Lung
2023/0009226 A1 * 1/2023 Parr ........................ B60C 7/143
2023/0010163 A1 * 1/2023 Parr ........................ B60B 7/063
2023/0042193 A1 2/2023 Parr
2023/0069943 A1 3/2023 Miles
2023/0191837 A1 6/2023 Hinque
2023/0311571 A1 * 10/2023 Hinque ................... B60C 7/146
152/65

OTHER PUBLICATIONS

Corn, M., “It'll never go flat”, Tyre Asia pp. 104-105, 108, Oct./Nov. 2017.

* cited by examiner

NON-PNEUMATIC TIRE

BACKGROUND OF THE INVENTION

Current non-pneumatic tire designs by the leading tire companies are web structures that are oriented laterally across the tire cavity which would limit lateral flexibility, unique to current pneumatic tire flex characteristics. These current designs are going to require passenger vehicle manufacturers to completely redesign suspension components to compensate for the unique flex characteristics of current non-pneumatic development concepts. A non-pneumatic tire design that can flex in a similar manner to current production pneumatic tires and can use current automobile wheel profiles would be very beneficial.

BRIEF SUMMARY OF THE INVENTION

The disclosure relates to a non-pneumatic tire comprising a pair of annular inner rim beads disposed parallel to each other and defining a cylinder. The rim beads can define the opposing ends of the cylinder. The cylinder can have an axis of rotation coincident with an axis of rotation of the tire wherein outer and inner are relative to the axis of rotation of the tire, where inner is closer to the axis of rotation and outer is further away from the axis of rotation. The tire can include an annular outer layer oriented concentric with the circumference of the cylinder and comprising an outermost tread surface, the tread surface comprising tread rubber and tire carcass. The tire can include a plurality of equally spaced structural support units. Each support unit can include top and bottom members, and a plurality of flexible curved support members extending between the top member and bottom member.

The non-pneumatic tire can include wherein the top member, bottom member, and flexible support members cooperate to define first and second faces, and wherein the plurality of support units is arranged such that the first face of each support unit faces the second face of a neighboring support unit.

The non-pneumatic tire can include wherein the support units are arranged radially in relation to the axis of rotation along the circumference of the beads.

The non-pneumatic tire can include wherein the curved support members adjoin a central support rib that extends from the top member.

The non-pneumatic tire can include wherein the central support rib is disposed along a centerline of the tire.

The non-pneumatic can include a sidewall that connects the annular outer layer to the rim beads and encases the support members, rim beads, and interior surface of the annular outer layer.

The non-pneumatic tire can include wherein the plurality of spaced apart support units extend between the pair of beads.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
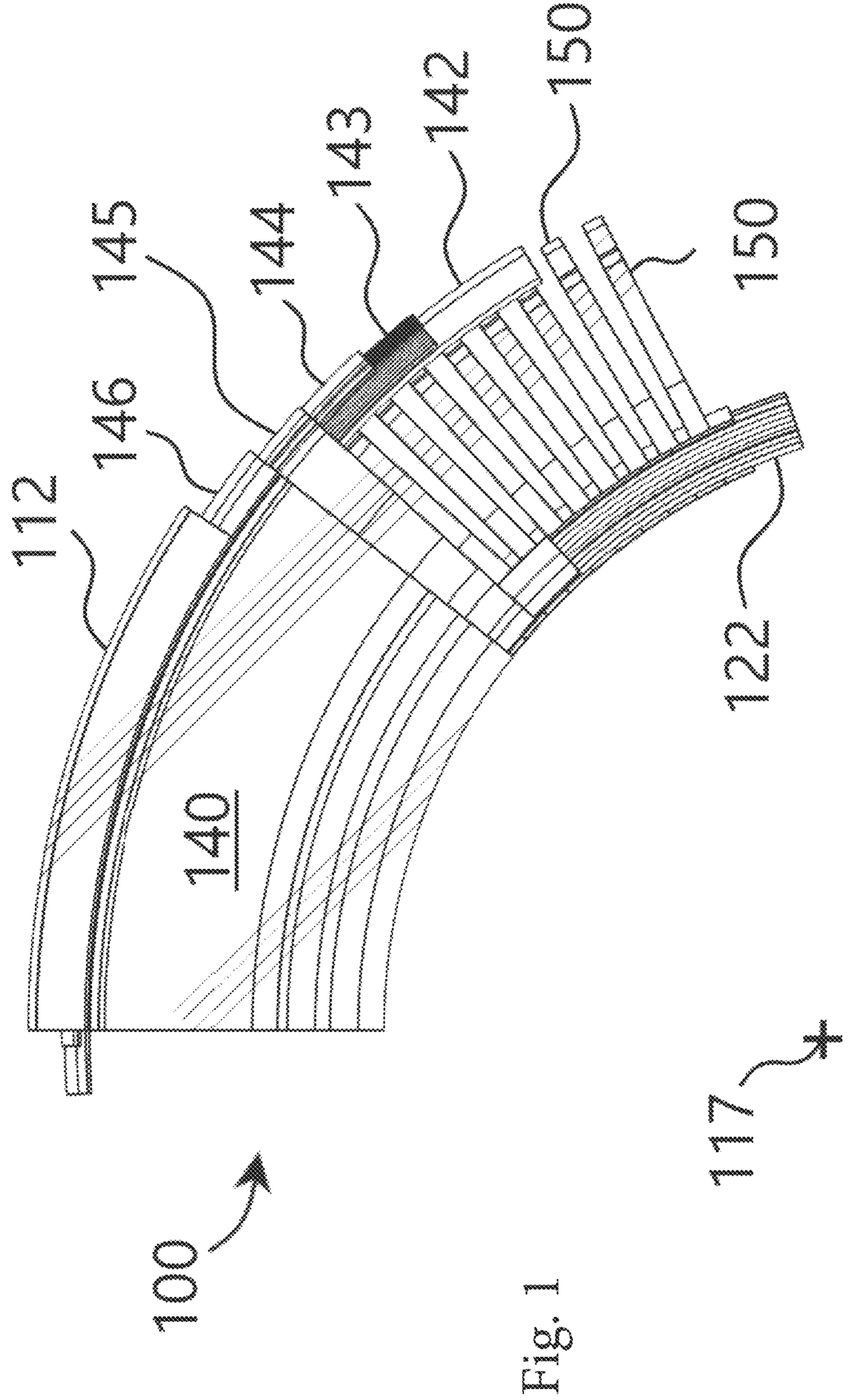
FIG. 1 is a partial cut away side view of an exemplary non-pneumatic tire.

The invention relates to a non-pneumatic tire cavity support structure that is maintenance free and performs in a manner similar to a current pneumatic tire product, using wheels that are already compatible with current pneumatic tires.

Current market development of non-pneumatic technology is likely to force passenger vehicle manufacturers to completely redesign suspension components to compensate for the unique flex characteristics of current non-pneumatic development concepts. Many of the current development designs by tire companies are web structures that are oriented laterally across the tire cavity which limits lateral flexibility, unique to current pneumatic tire flex characteristics. This increased lateral stiffness is likely to induce non-linear vehicle response during moderate handling maneuvers, such as cornering, which is more difficult for average drivers to manage.

The present invention seeks to use current automobile wheel profiles mated to designs of multi-piece wheels, i.e., wheels with an "outer tire bead securing rim" with barrel section and an "inner tire bead securing rim" with barrel section that is bolted together with a center wheel spoke design section that includes vehicle hub mounting holes. The present non-pneumatic tire design invention aims to eliminate major suspension redesigns and thus prevent major vehicle OEM suspension development costs. It also aims to eliminate the use of a specialized, proprietary non-pneumatic wheel and ease the transition to non-pneumatic tires for vehicle owners.

Many non-pneumatic tire concepts have not attempted to enclose the support web structural elements to protect from debris and performance-robbing foreign objects. The design herein has optional provisions for a protective layer to enclose and protect the web structure from debris and foreign objects.

The structural arm/spoke design includes several support members that extend from the bead to under the tire tread area to apply radial, torsional, and lateral forces as the tire structure is loaded. The structural support arms are molded into a fiber reinforced polymer composite for flexural strength and durability, with the under-tread band composed of multiple single strand aramid fibers wound onto the molded polymer structure for added load carrying capability, stiffness, and durability. The bead bundle of the design is a continuous wound carbon fiber (although other compositions are possible) strand design creating a very stiff bead structure to ensure bead seating at extreme lateral (cornering) and radial loads.

Turning now to the figures, FIGS. 1-9 show an exemplary non-pneumatic tire 100 comprising an outermost tread surface 112 composed of tread rubber and tire carcass similar in construction to current production pneumatic tires but with reduced rubber and material gauge given that the tire carcass is non-load bearing. The outer tread surface 112 faces away from the axis of rotation 117.

A pair of annular inner rim beads 122 are disposed parallel to each other and define a cylinder, wherein the rim beads define the opposing ends of the cylinder. The tread surface 112 is an annular outer layer oriented concentric to the circumference of the cylinder, wherein outer and inner are relative to an axis of rotation 117 of the tire, where inner is closer to the axis of rotation and outer is further away from the axis of rotation 117. In this case, the rim beads 120 are inner in relation to the tread surface 112.

Figure 8:
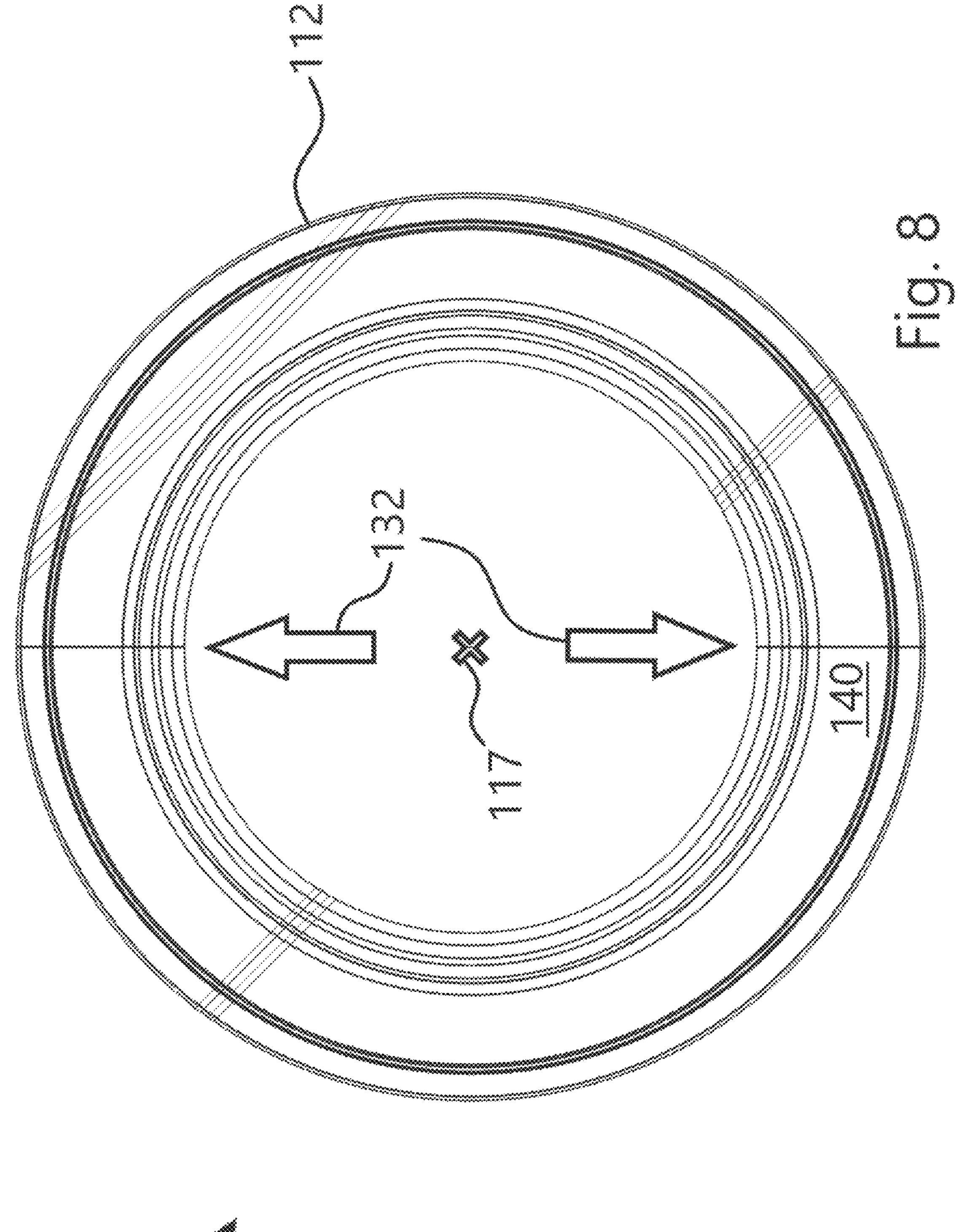
FIG. 8 is a side view of an exemplary non-pneumatic tire.

Several individual support units 150 connect the rim beads 120 to the tire carcass and tread 112 in a radial direction and provide support in the radial direction 132 (See, FIG. 8). The support units 150 span between and connect to the rim beads 122. The plurality of support units 150 also provide support in the lateral direction 133 as well as in the radial direction 132 (See, FIG. 9).

The tire carcass includes rubber skim coating 146 disposed beneath (i.e. inner to, or closer to the axis of rotation 117 than) the tread surface 112. A carcass ply 145 is disposed under (inner to) the skim coating. Steel belts 144 are disposed under (inner to) the carcass ply 145. A fiber layer 143 is disposed under (inner to) the steel belts 144. The fiber layer 143 can be composed of various polymer fibers (aramid, nylon, polyester, etc.). A cylindrical structural layer 142 is disposed between the fiber layer and the individual support members 150, and may be joined to the support members 150. In an exemplary embodiment, the cylindrical structural layer 142 is fused/formed as an integral unit to the support members 150.

Figure 2:
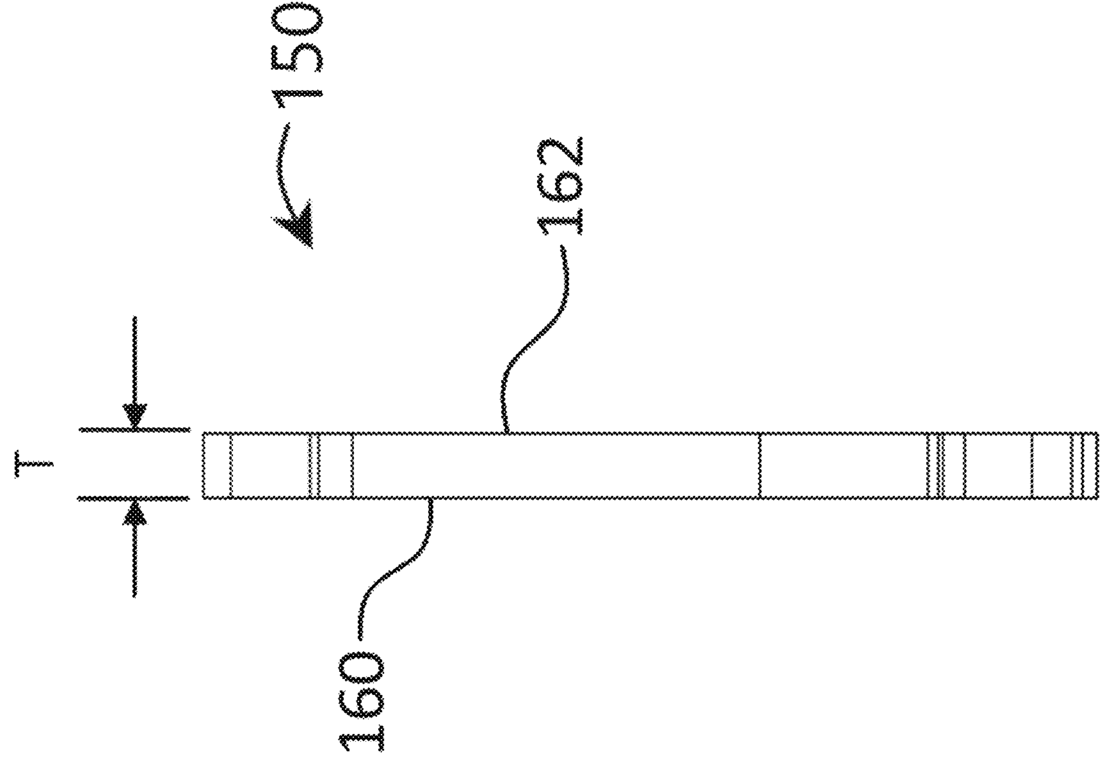
FIG. 2 is a side view of an exemplary support unit.
Figure 5:
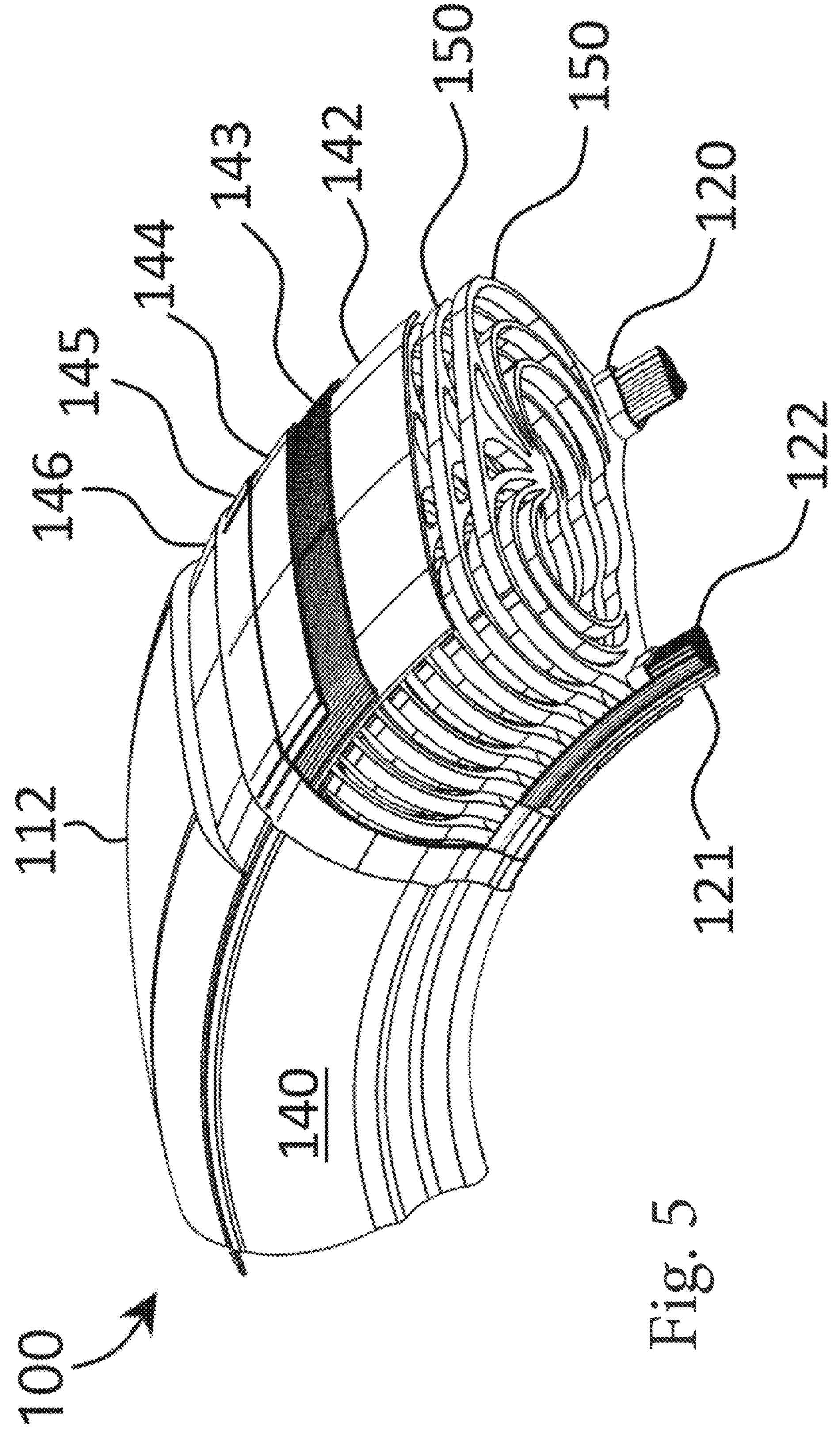
FIG. 5 is a partial cut away perspective view of the tire of FIG. 1.
Figure 6:
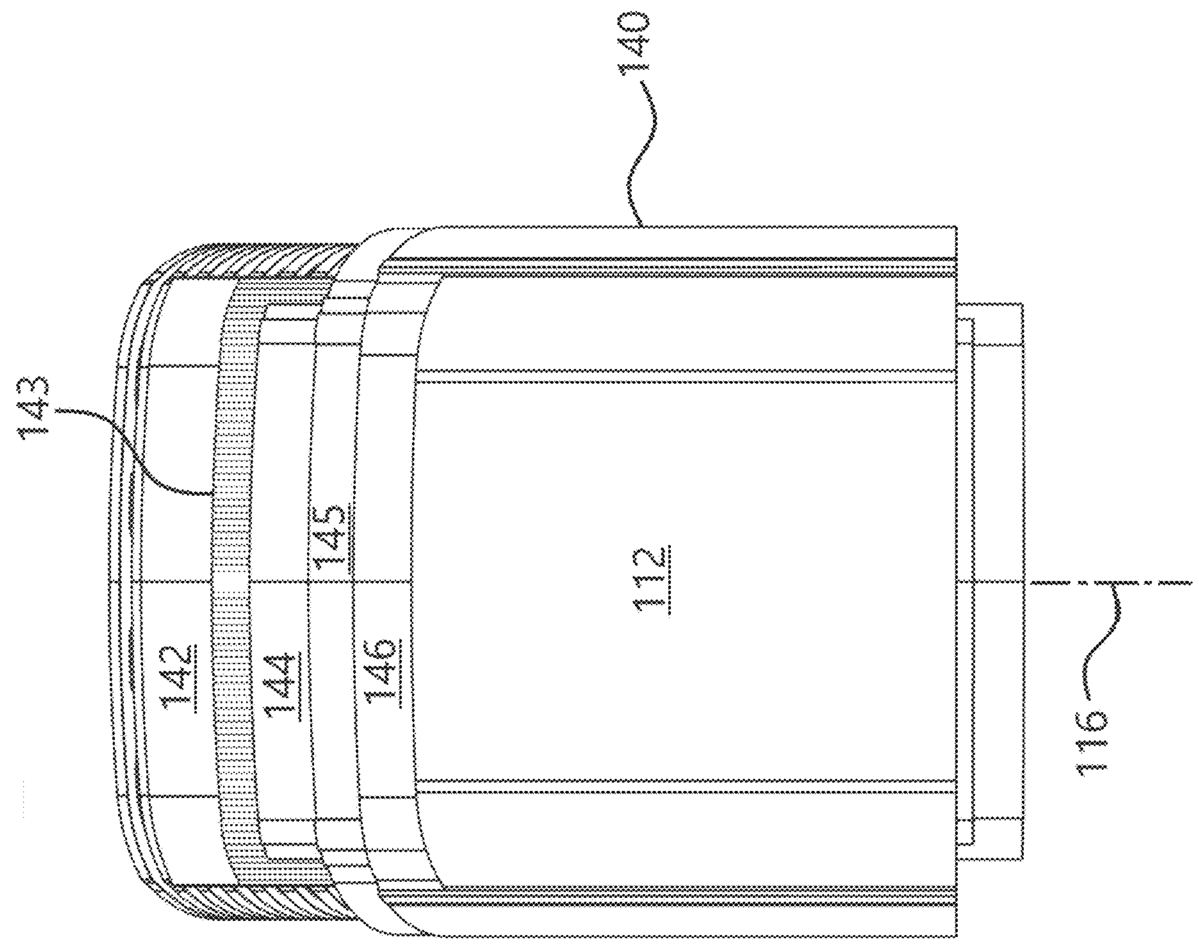
FIG. 6 is a partial cut away top view of the tire of FIG. 1.
Figure 7:
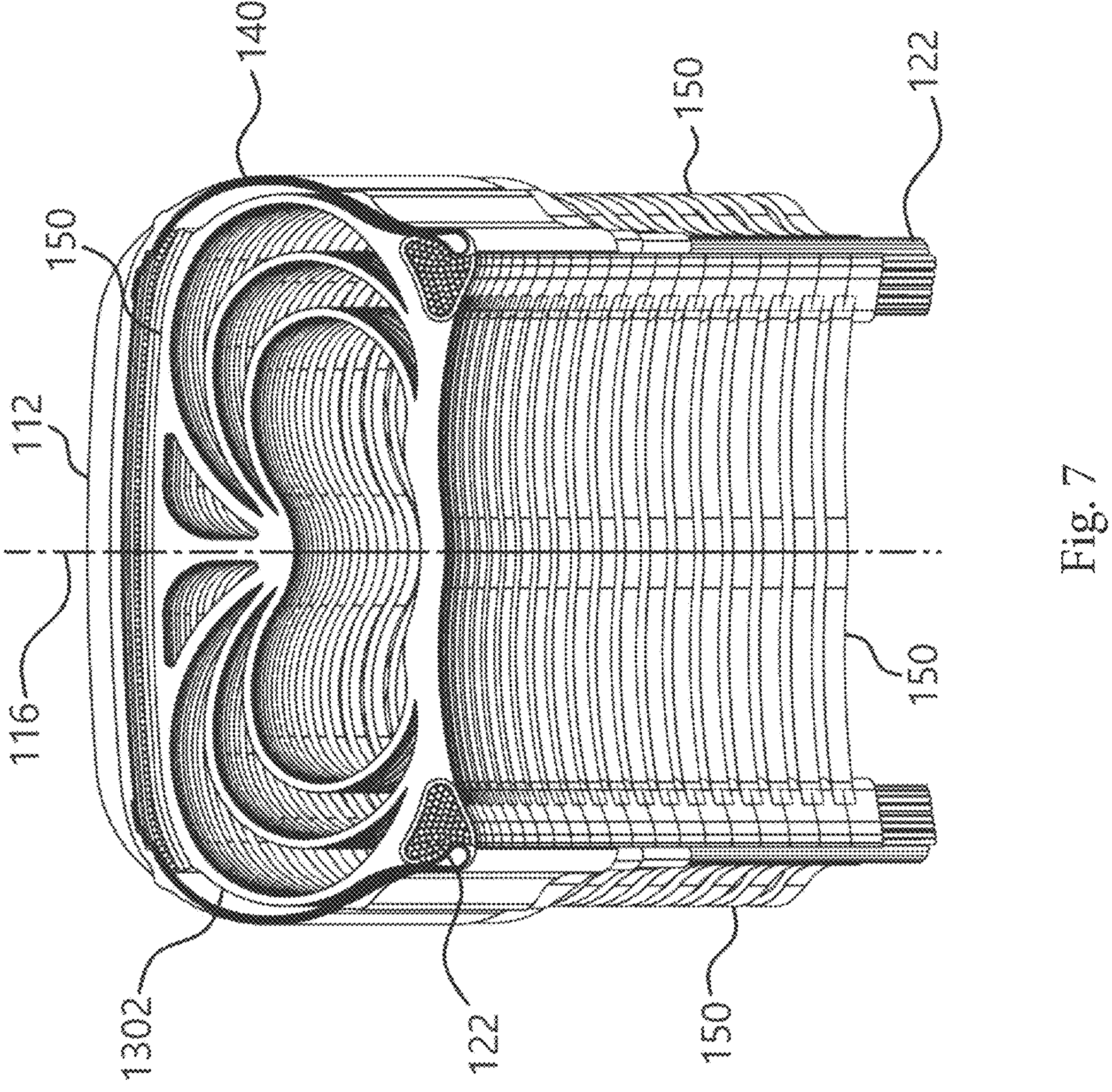
FIG. 7 is a partial cross-sectional front view of the tire of FIG. 1.

The individual support units 150 are the primary means of support of the tire 100. The support units 150 are arranged radially from the axis of rotation and are lined up next to each other and evenly spaced apart around the circumference of the cylinder, along the bead 122. As shown in FIG. 2, each support unit has first 160 and second 162 opposing faces (or a front 160 and rear/back 162 face, however the faces are identical, and may be referred to as front and rear/back to distinguish between opposing faces). As FIGS. 1 and 5 show, the support units 150 are arranged such that the first face 160 of each support unit 150 faces the second face 162 of a neighboring support unit 150, with a space between each support unit 150.

Figure 3:
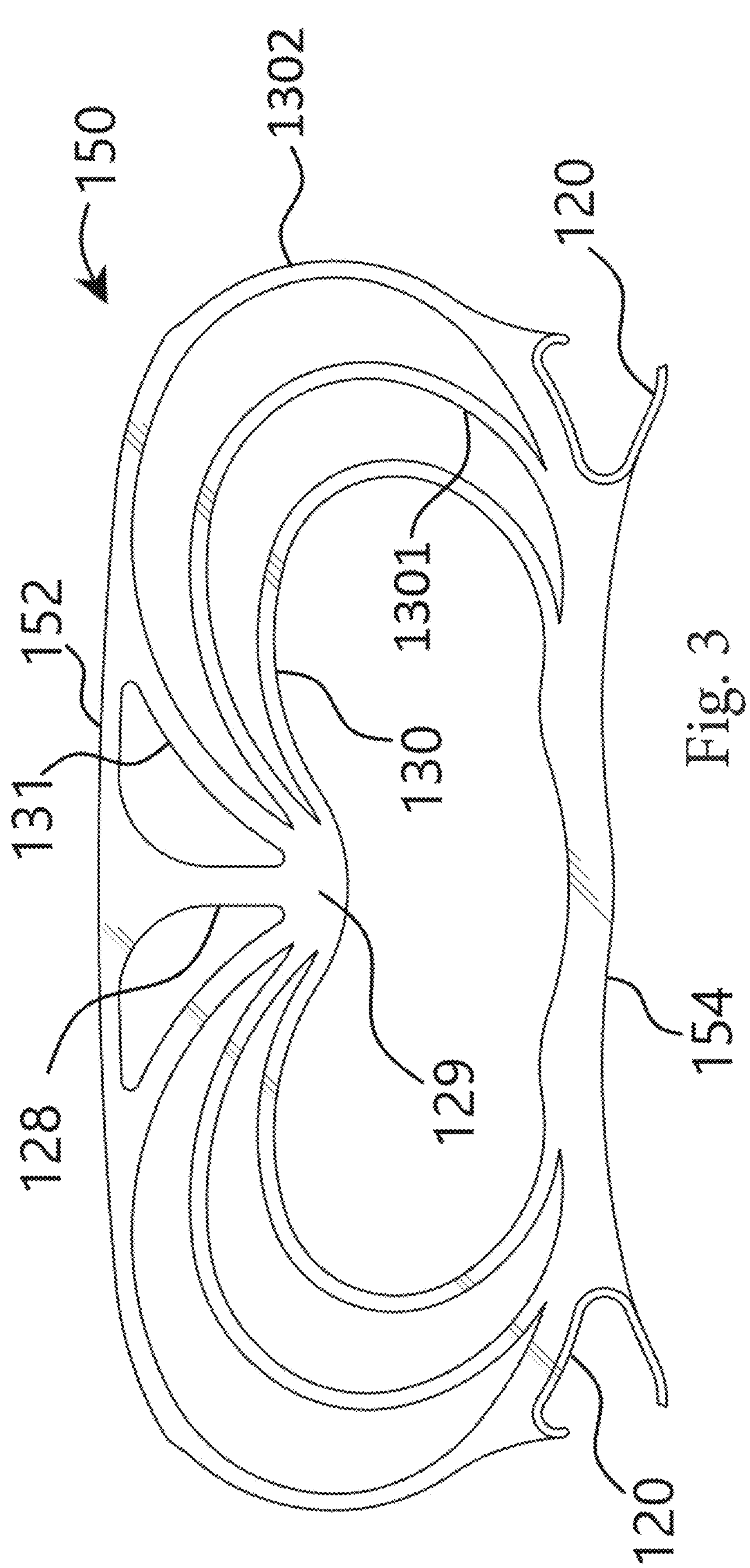
FIG. 3 is a front view of the support unit of FIG. 2.
Figure 4:
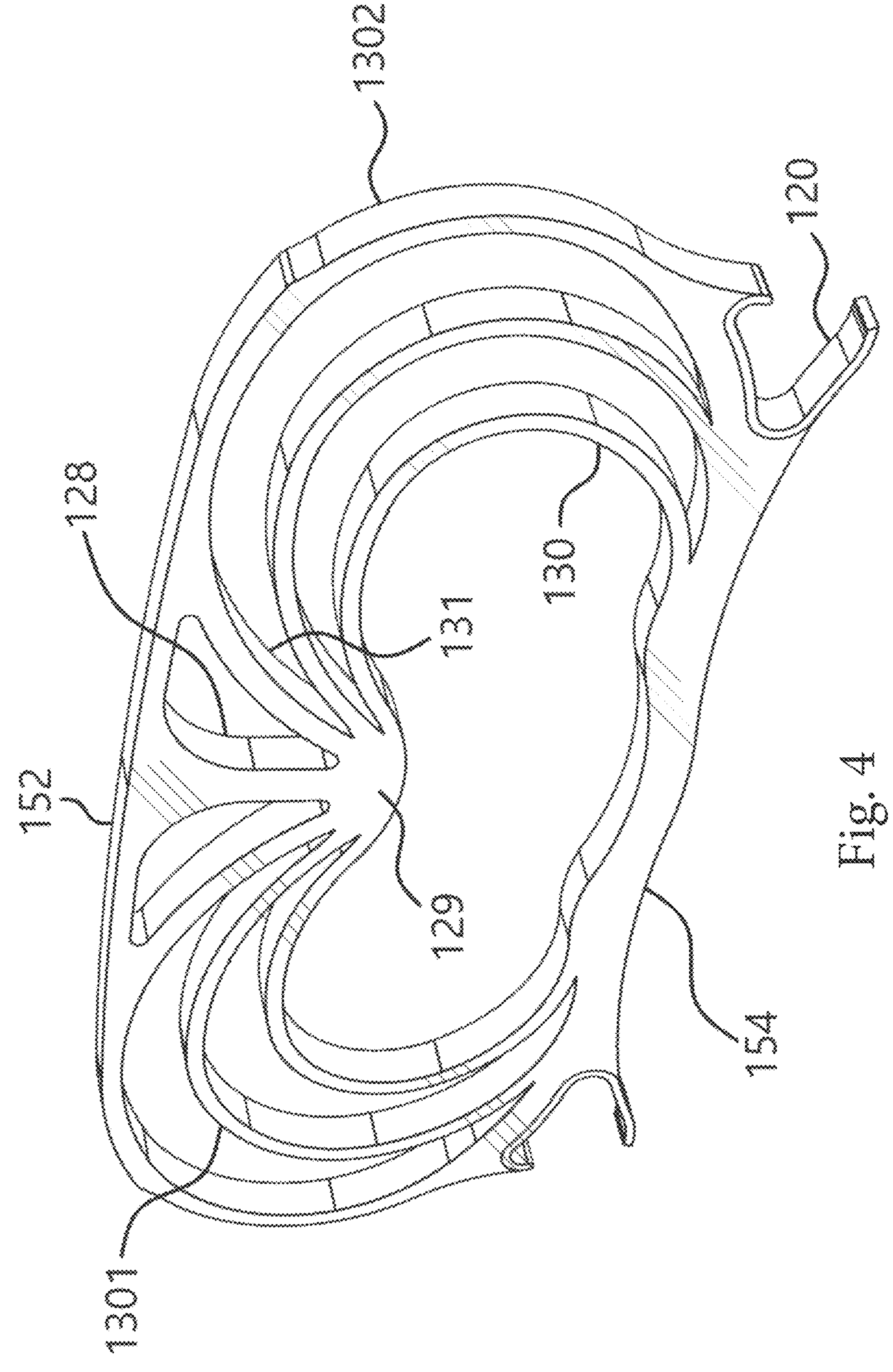
FIG. 4 is a perspective view of the support unit of FIG. 2.

An exemplary embodiment of an individual support unit 150 is shown in FIG. 3. Each support unit 150 has top 152 and bottom 154 structural members. A plurality of flexible curved support members 130 extend between the top member 152 and bottom member 154. The top member 152, bottom member 154, and flexible support members 130 cooperate to define first and second faces (160, 162). As used here, the flexible curved support members 130 can also be referred to as, and have the same meaning as, spokes, structural arm(s), or ribs. The curved support members can comprise multiple support members 130, 1301, 1302. Unless otherwise specified, any reference to support member 130 or support members 130 includes reference to all support members collectively 130, 1301, 1302, etc.

The support unit 150 can include a central support rib 128 that is aligned with the centerline 116 of the tire 100. The support members 130 join the bottom member 154 to the top member 152 and connect at a central support nexus 129. The nexus 129 is a hub or connecting structure where all the ribs/support members connect. This nexus 129 also limits the total compression of the tire (i.e. a bump stop). A partial support rib 131 can connect the nexus to the top member 152 and is a continuation of the outer support member 1302. The support members 130-1302 can be polymer or metal, such as spring steel. In the alternative, the entire support unit 150 can be polymer or metal, such as spring steel.

Figures 10A, 10B, 10C, 10D:
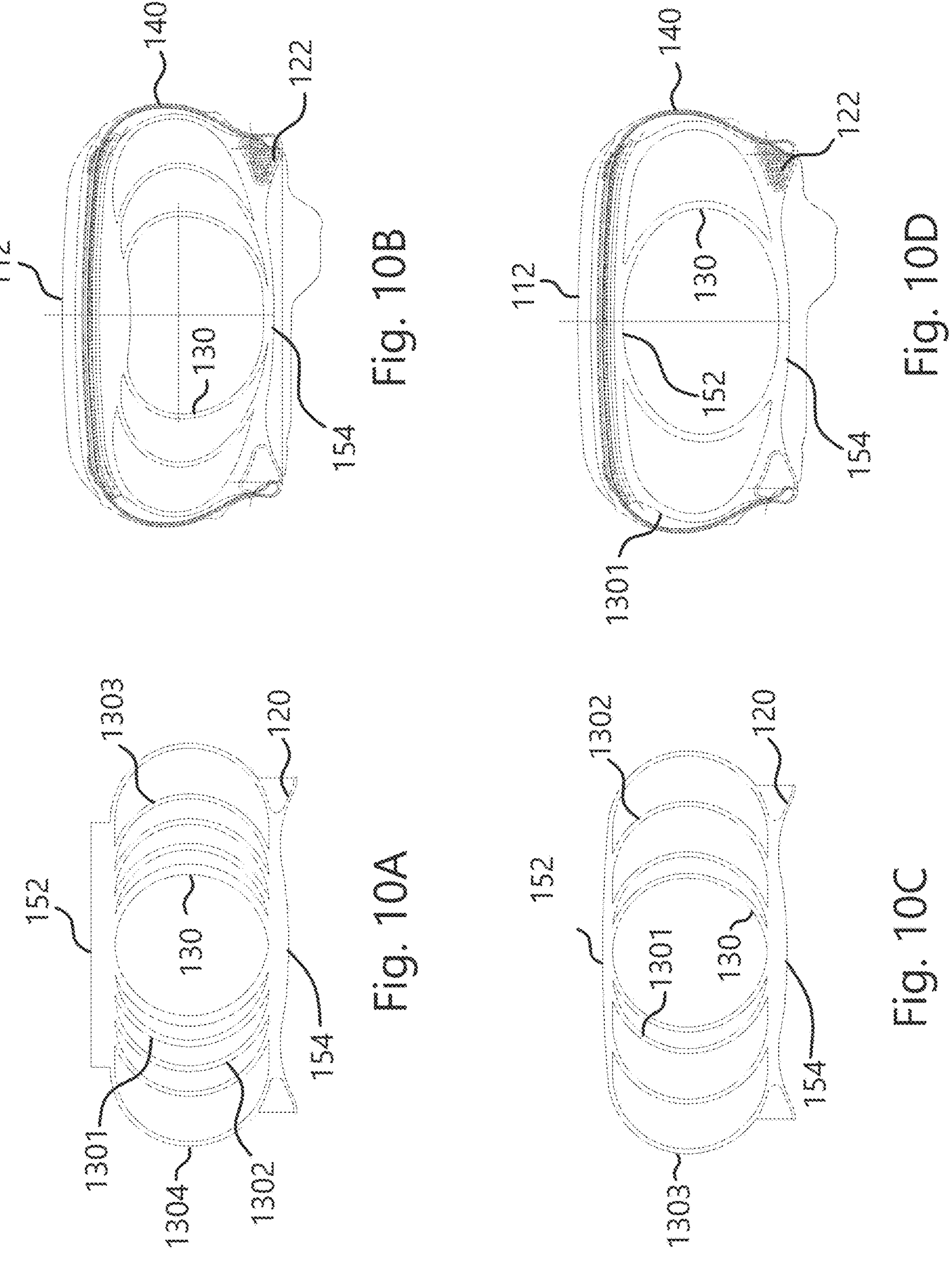
FIGS. 10A-10H are alternate embodiments of exemplary individual support units.
Figures 10E, 10F, 10G, 10H:
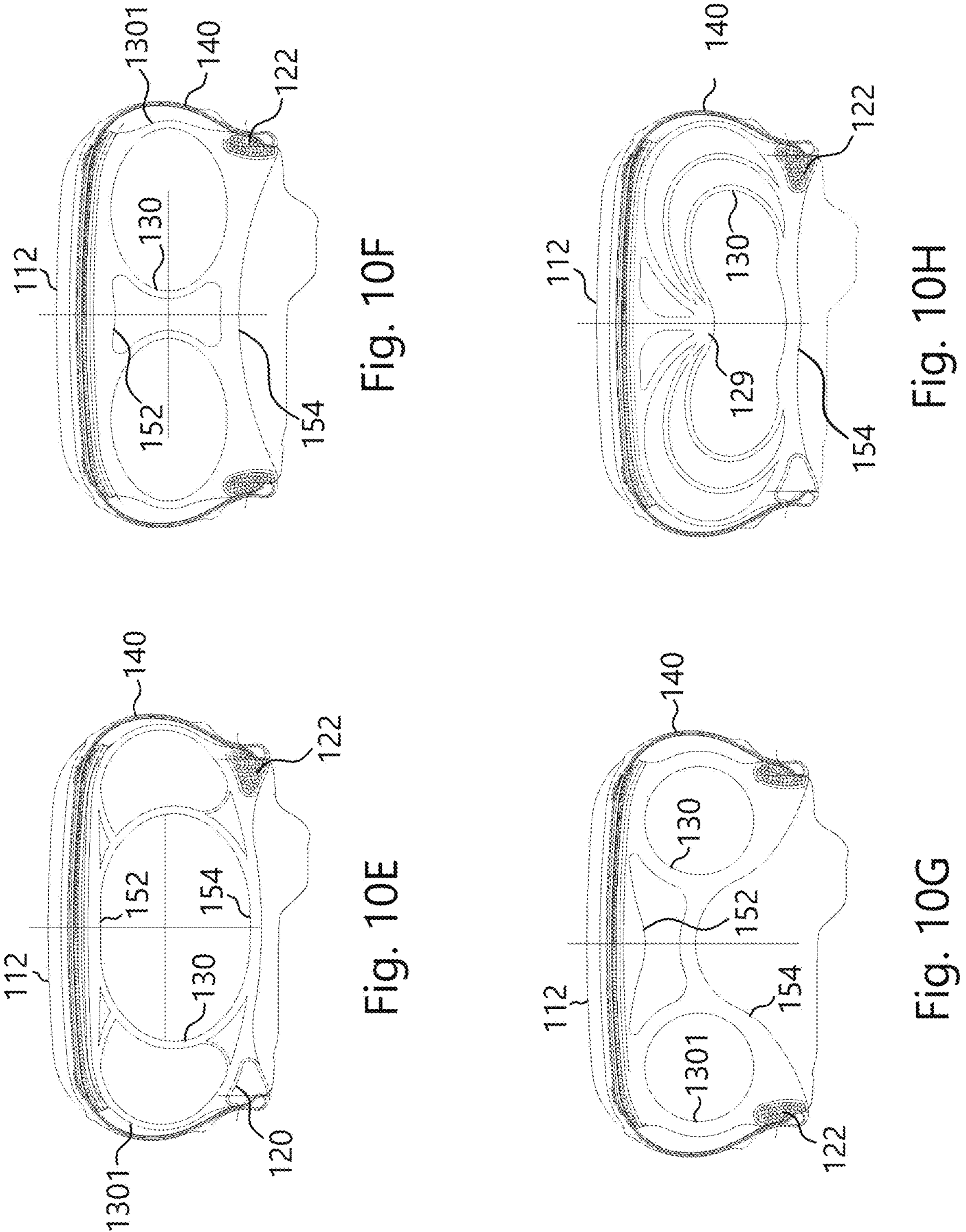

Alternate embodiments of support units are shown in FIGS. 10A-10H. As can be seen, the support units 150 can have different numbers of support members 130, top and bottom members 152, 154 in different arrangements or orientations. The support units can comprise many support units, up to n support units, where n is a positive integer greater than zero. In other words, the support members can include support members 130, 1301, 1302, 1303, . . . , **130*n*. FIG. 10H is substantially similar to FIGS. 3 and 7**.

FIGS. 1, and 5-7 show an embodiment of an exemplary non-pneumatic tire that includes a sidewall 140 that connects the outer tread layer 112 to the rim beads 122 and encases support members 150, rim beads 122, and the interior surface of the tire into an enclosed volume. The sidewall 140 prevents debris and other foreign objects from getting inside the interior of the tire, which can damage the tire, or disrupt driving. The sidewall also provides additional supplementary lateral support for the tire 100.

As shown in FIG. 5, the bead 122 is composed of a bead cover or sheath 120, which is a cup shaped structure to encapsulate and help bond the multiple carbon strand bead fibers 121. This combination provides a substantial structural fileted base to support the individual support units 150 helping to transition and support radial loads from the tread 112 to the bead bundle 122. The tire can include composite, structural layer element 142 attached/integrated with the support units 150 and serve as a support surface for bonding the aramid fiber single strand winding 143 for added structural load carrying capability. The tire cavity design is relatively common tire cavity construction of rubber impregnated body ply 145 of aramid, nylon, or polyester fibers 143, steel belts 144 and tread cap 112 with tread designs. The steel belt 144 is optional and can be in an amount between zero to two or more, and are disposed under the tread surface for added performance characteristics. The cavity construction rubber and steel belts help to maintain the proper grip/friction to the vehicle wheel to account for the torque with vehicle drive axels.

Figure 9:
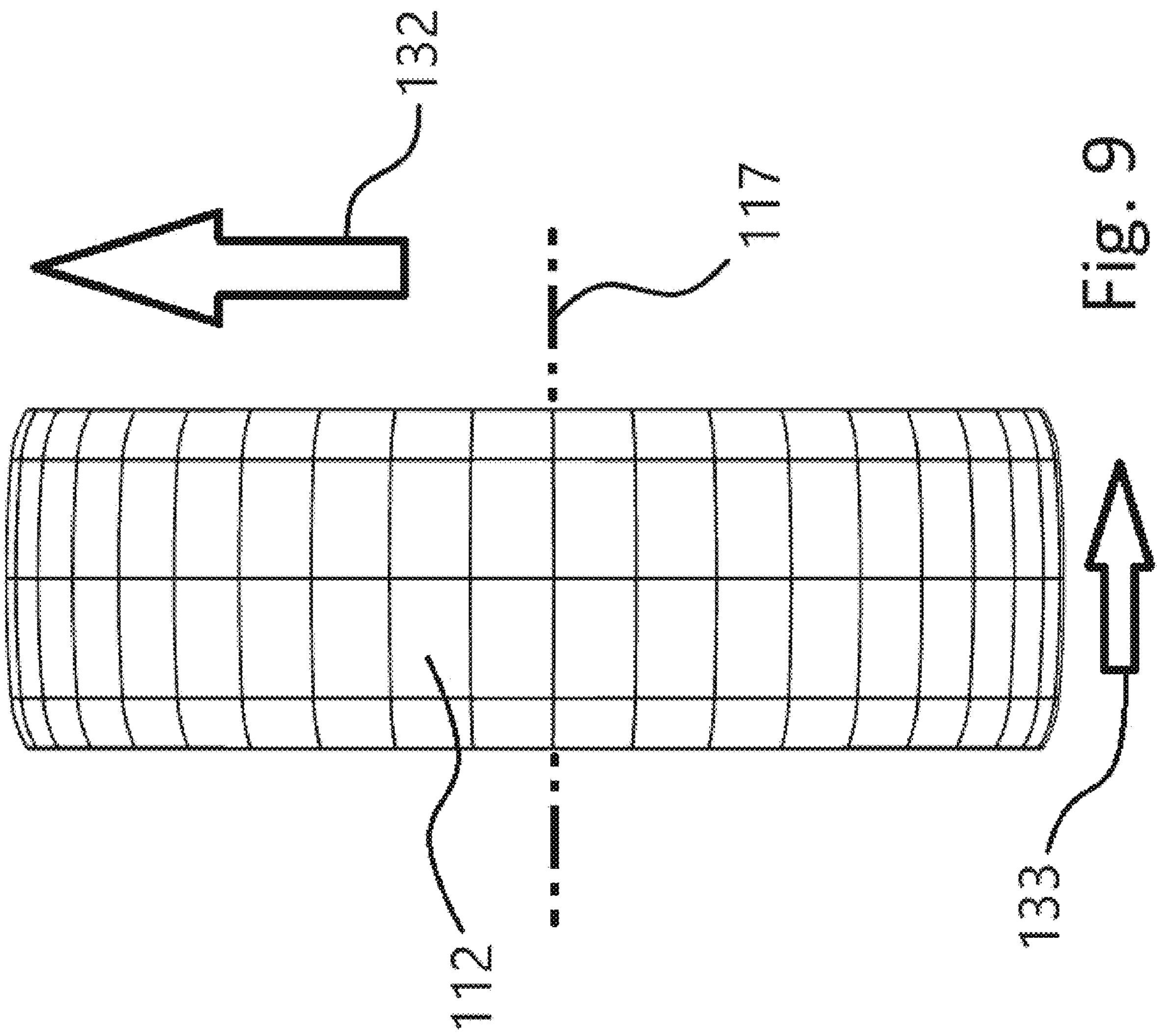
FIG. 9 is a front view of an exemplary non-pneumatic tire.

FIG. 9 shows the radial direction 132 and lateral direction 133 with respect to the tire.

Figure 11:
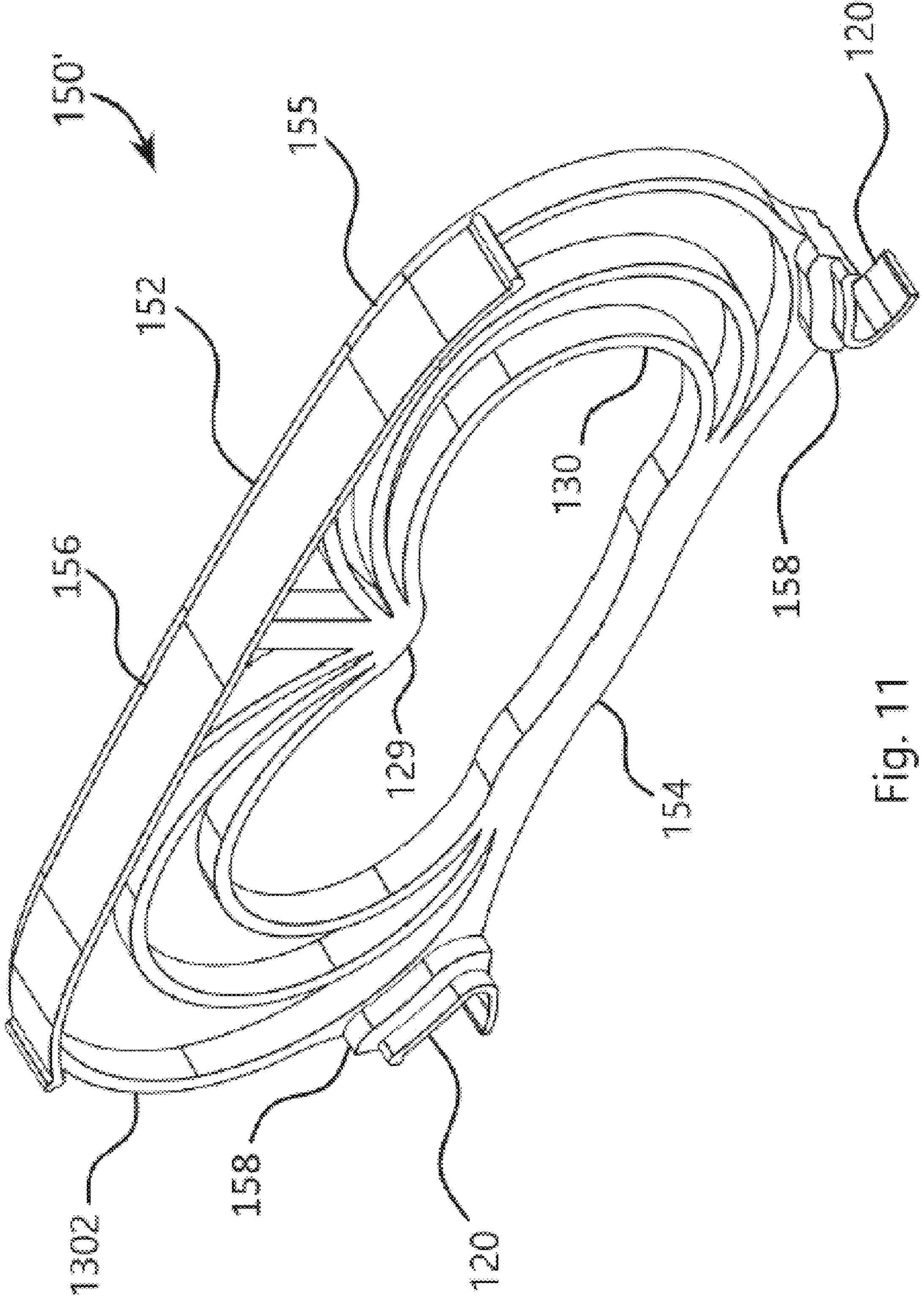
FIG. 11 is a perspective view of an alternate exemplary embodiment of a support unit.
Figure 12:
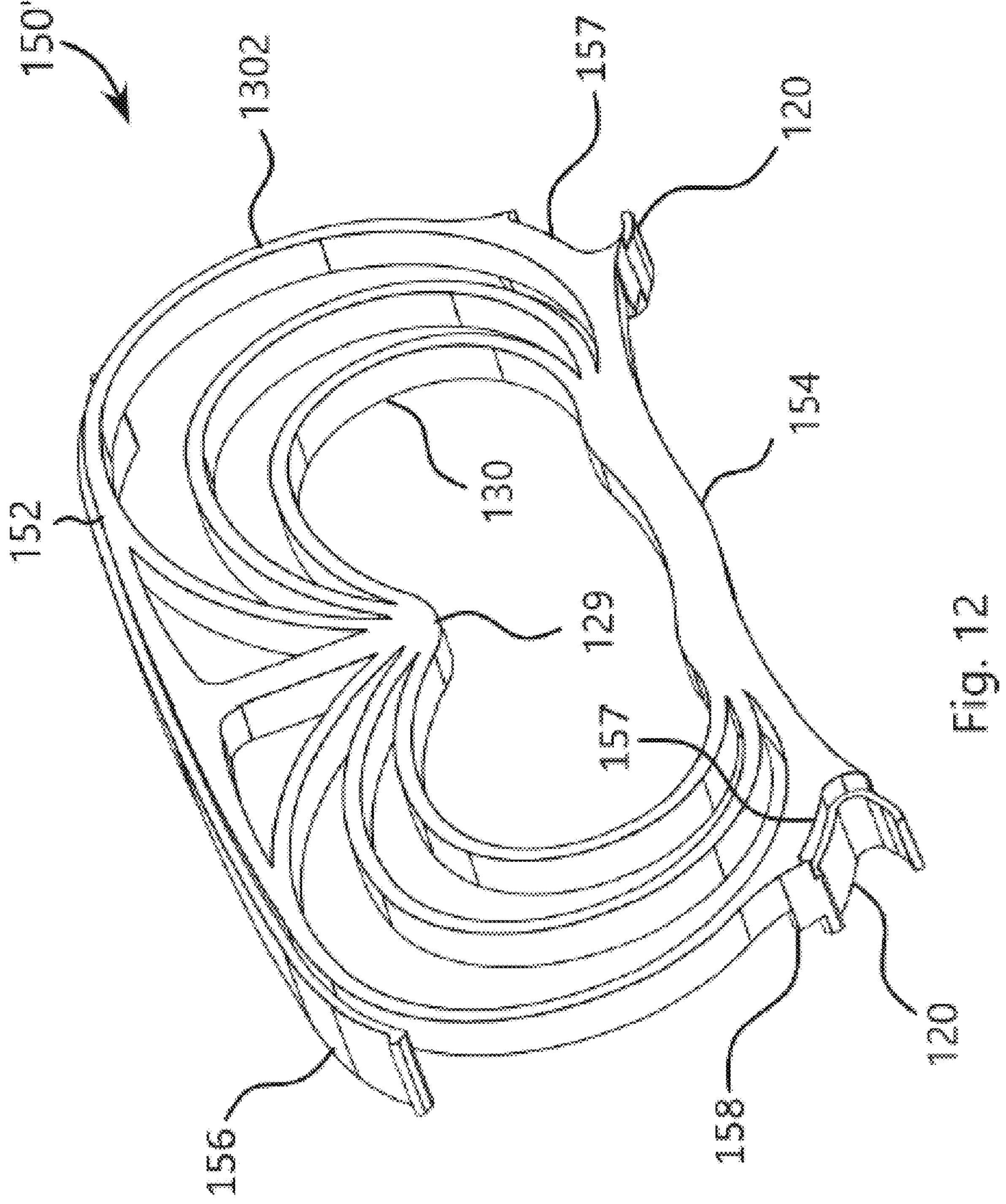
FIG. 12 is a second perspective view of the support unit of FIG. 11.
Figure 13:
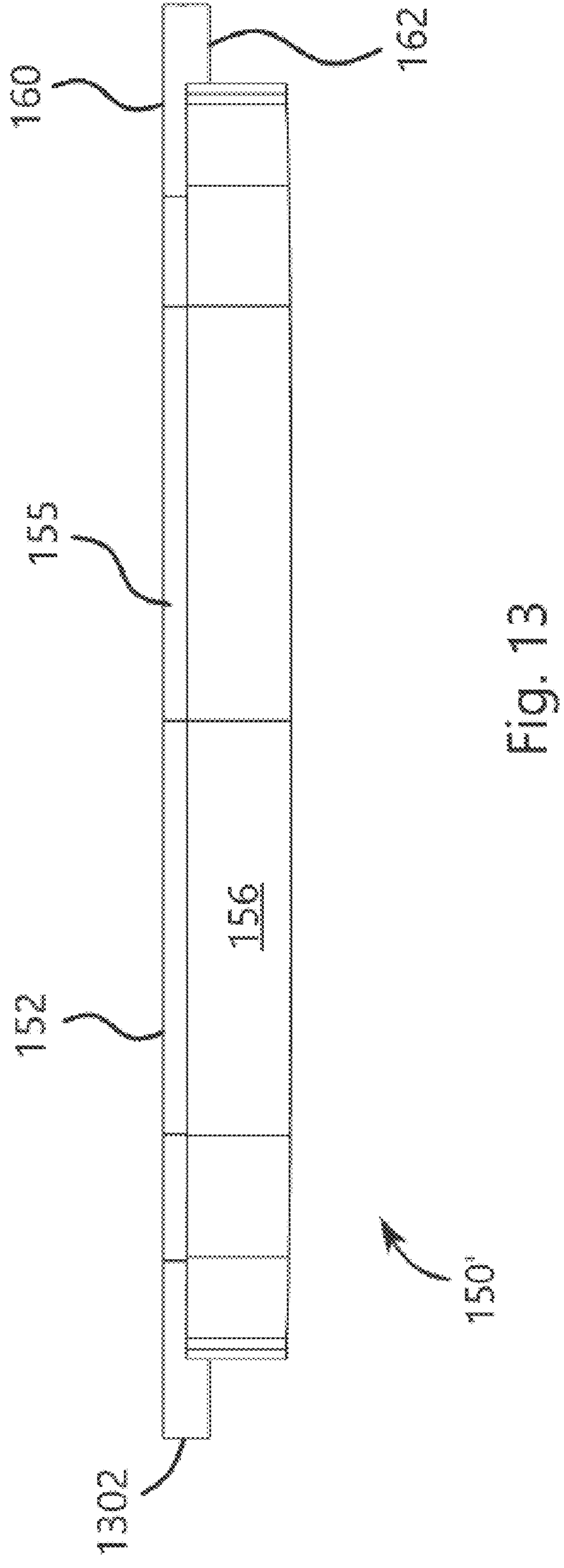
FIG. 13 is a top view of the support unit of FIG. 11.

FIGS. 11, 12, and 13 show an alternate preferred embodiment of the support unit 150'. Support unit 150' is similar to the support unit 150 shown in in FIGS. 3 and 4, however, support unit 150' has some additional features, including an upper alignment and bonding flange 156, an alignment and bonding notch 157, and gusseting 158 along the bead cover 120.

The upper alignment and bonding flange 156 allows support units to bond with upper bonding surface 155 on neighboring support units 150'. The bond can be a mechanical and/or adhesive bond. When the support units 150' are installed, and the upper bonding flanges 156 are attached to each neighboring support unit 150' at upper bonding surface 155, the flanges 156 collectively form the structural layer 142 (See FIGS. 1 and 5). The alignment and bonding flange 156 further creates a smooth platform for winding the structural single filament wrap 143 (such as aramid fibers) for the under-tread surface.

The alignment and bonding notch 157/gusset 158 is gusseting to help bolster and supply a larger surface area for bonding the base/bead area 120 for the base of the main structural unit 150'. In this embodiment, the bead sheath can be referred to a lower bonding flange or bead flange 120. This combination of bead flange 120 and gusseting 158 is designed to help bolster the base of the support unit 150'. The flange portions 120 are designed to overlap/lock into flange offset notch 157 in the adjoining support unit 150' for alignment and bonding. The upper bonding flange 156 overlaps the adjoining support unit 150' at upper bonding surface 155 in the same manner, for alignment and bonding. The bond can be a mechanical and/or adhesive bond.

As with the other parts of the support unit 150, 150', the flange 156, notch 157, and gusseting 158 are formed integrally with the support unit 150' as a single piece. The support unit 150' can be produced as a single piece via molding, 3D printing, machining, or extruding.

Many parts of this exemplary embodiment, like many other inventions, can have all the parts manipulated into different lengths, widths, and heights not proportional to all the figures provided. While not being proportional, all elements can still be configured to perform the same basic principal function. This must be particularly pointed out for this type of invention due to the nature of the invention, needing to accommodate different wheels and suspensions.

Moreover, the term “or” is intended to mean an inclusive “or” rather than an exclusive “or.” That is, unless specified otherwise, or clear from the context, the phrase “X employs A or B” is intended to mean any of the natural inclusive permutations. That is, the phrase “X employs A or B” is satisfied by any of the following instances: X employs A; X employs B; or X employs both A and B. In addition, the articles “a” and “an” as used in this application and the appended claims should generally be construed to mean “one or more” unless specified otherwise or clear from the context to be directed to a singular form. Additionally, as used herein, the term “exemplary” is intended to mean serving as an illustration or example of something and is not intended to indicate a preference.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a “means”) used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A non-pneumatic tire comprising:

a pair of annular inner rim beads disposed parallel to each other and defining a cylinder, wherein the rim beads consist of a pair of spaced apart rings that define the opposing ends of the cylinder, wherein the cylinder has an axis of rotation coincident with an axis of rotation of the tire wherein outer and inner are relative to the axis of rotation of the tire, where inner is closer to the axis of rotation and outer is further away from the axis of rotation;

an annular outer layer oriented concentric with the circumference of the cylinder and comprising an outermost tread surface, the tread surface comprising tread rubber and tire carcass;

a plurality of spaced apart support units disposed inner to the annular outer layer and extending from at least one of the rim beads to the annular outer layer, each support unit including:

top and bottom members;

a plurality of flexible curved support members extending between the top member and bottom member.

2. The non-pneumatic tire of claim 1, wherein the top member, bottom member, and flexible support members cooperate to define first and second faces;

wherein the plurality of support units is arranged such that the first face of each support unit faces the second face of a neighboring support unit.

3. The non-pneumatic tire of claim 1, wherein the support units are arranged radially in relation to the axis of rotation along the circumference of the beads.

4. The non-pneumatic tire of claim 1, wherein the curved support members adjoin a straight central support rib that vertically extends part way from the top member toward the bottom member.

5. The non-pneumatic tire of claim 4, wherein the central support rib radially extends along a centerline of the tire.

6. The non-pneumatic tire of claim 1, further comprising a sidewall that connects the annular outer layer to the rim beads and encases the support members, rim beads, and interior surface of the annular outer layer.

7. The non-pneumatic tire of claim 1, wherein the plurality of spaced apart support units extend between the pair of beads.

8. The non-pneumatic tire of claim 1, wherein the central support rib is a bump stop that, upon compression of the tire, limits range of compression by abutting the bottom member.

9. The non-pneumatic tire of claim 1, wherein the support units consist of a polymer.

10. The non-pneumatic tire of claim 1, wherein each of the support units is a single integral piece.

11. The non-pneumatic tire of claim 1, wherein each rim bead consists of a plurality of carbon strand fibers.

* * * * *